(12) United States Patent
Shin et al.

(10) Patent No.: US 9,197,981 B2
(45) Date of Patent: Nov. 24, 2015

(54) COORDINATION AMONGST HETEROGENEOUS WIRELESS DEVICES

(71) Applicant: The Regents of The University of Michigan, Ann Arbor, MI (US)

(72) Inventors: Kang G. Shin, Ann Arbor, MI (US); Xinyu Zhang, Madison, WI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 200 days.

(21) Appl. No.: 13/770,601

(22) Filed: Feb. 19, 2013

(65) Prior Publication Data

US 2013/0155957 A1    Jun. 20, 2013

Related U.S. Application Data

(63) Continuation-in-part of application No. 13/439,900, filed on Apr. 5, 2012, now Pat. No. 8,861,414.

(60) Provisional application No. 61/473,356, filed on Apr. 8, 2011, provisional application No. 61/754,162, filed on Jan. 18, 2013.

(51) Int. Cl.
*H04W 4/00* (2009.01)
*H04W 56/00* (2009.01)
*H04W 76/02* (2009.01)
(Continued)

(52) U.S. Cl.
CPC ............ *H04W 4/00* (2013.01); *H04W 52/0245* (2013.01); *H04W 56/001* (2013.01); *H04W 76/021* (2013.01); *H04W 88/028* (2013.01)

(58) Field of Classification Search
USPC .................. 370/310, 328–329, 335; 375/260; 713/322
See application file for complete search history.

(56) References Cited

U.S. PATENT DOCUMENTS 3,824,714 A * 7/1974 Glassman .................... 36/7.1 R
3,825,714 A * 7/1974 Marendaz .................. 219/69.16
4,103,337 A * 7/1978 Whiteside ................ 340/870.21
(Continued)

FOREIGN PATENT DOCUMENTS

EP           1322061 A2    6/2003
WO    WO2007/111941      10/2007

OTHER PUBLICATIONS

K. Jamieson et al "PPR: Partial Packet Recovery for Wireless Networks", SIGCOMM'07, (Aug. 2007).
(Continued)

*Primary Examiner* — Edan Orgad
*Assistant Examiner* — Steven Willmore
(74) *Attorney, Agent, or Firm* — Harness, Dickey & Pierce, PLC

(57) ABSTRACT

A computer-implemented method is proposed for coordinating communication amongst wireless communication devices in a wireless network. The coordination scheme creates a side channel between heterogeneous wireless devices to enhance their cooperation. At the transmitter, the coordination scheme appends a customized preamble to a data payload, where the preamble is comprised of a sequence of energy pulses separated by a gap and the duration of the gap encodes coordination data for the receive device. At the receiver, the coordination scheme detects the preamble of the data packet; extracts the coordination data from the preamble of the data packet; and coordinates communication between the transmit device and the receive device using the coordination data.

19 Claims, 11 Drawing Sheets

(51) Int. Cl.
*H04W 88/02* (2009.01)
*H04W 52/02* (2009.01)

(56) References Cited

U.S. PATENT DOCUMENTS

| | | | |
|---|---|---|---|
| 4,114,155 A | 9/1978 | Raab | |
| 4,459,591 A * | 7/1984 | Haubner et al. | 340/7.45 |
| 5,187,471 A | 2/1993 | Wagai et al. | |
| 5,663,731 A * | 9/1997 | Theodoras et al. | 342/70 |
| 5,809,313 A * | 9/1998 | Gianni | 713/310 |
| 6,009,319 A | 12/1999 | Khullar et al. | |
| 6,038,233 A | 3/2000 | Hamamoto et al. | |
| 6,043,848 A | 3/2000 | Richter | |
| 6,084,905 A * | 7/2000 | Ishifuji et al. | 375/133 |
| 6,269,043 B1 | 7/2001 | Batcher | |
| 6,393,502 B1 * | 5/2002 | Meyer et al. | 710/58 |
| 6,397,053 B1 | 5/2002 | Ghiazza | |
| 6,442,145 B1 * | 8/2002 | De Lange et al. | 370/310 |
| 6,493,824 B1 * | 12/2002 | Novoa et al. | 713/162 |
| 6,836,549 B1 * | 12/2004 | Quan et al. | 380/221 |
| 7,952,988 B2 * | 5/2011 | Lee et al. | 370/208 |
| 8,112,650 B2 | 2/2012 | Qing et al. | |
| 2003/0223521 A1 * | 12/2003 | Astrachan | 375/354 |
| 2004/0005068 A1 * | 1/2004 | Zeevi et al. | 381/107 |
| 2004/0010356 A1 * | 1/2004 | Lenz | 701/19 |
| 2004/0218699 A1 | 11/2004 | Carsello | |
| 2005/0031021 A1 * | 2/2005 | Baker et al. | 375/142 |
| 2005/0094784 A1 * | 5/2005 | Melick et al. | 379/90.01 |
| 2005/0261834 A1 * | 11/2005 | Szajnowski et al. | 701/301 |
| 2006/0116073 A1 * | 6/2006 | Richenstein et al. | 455/3.06 |
| 2007/0006007 A1 * | 1/2007 | Woodbridge et al. | 713/322 |
| 2007/0030829 A1 * | 2/2007 | Vimpari et al. | 370/335 |
| 2007/0080856 A1 * | 4/2007 | Camp | 342/357.12 |
| 2007/0082647 A1 | 4/2007 | Behzad et al. | |
| 2008/0159454 A1 * | 7/2008 | Ye et al. | 375/354 |
| 2008/0287145 A1 * | 11/2008 | Harris | 455/458 |
| 2009/0046625 A1 * | 2/2009 | Diener et al. | 370/319 |
| 2009/0185674 A1 * | 7/2009 | Sorensen et al. | 379/406.01 |
| 2009/0265167 A1 * | 10/2009 | Ehara et al. | 704/219 |
| 2009/0323686 A1 * | 12/2009 | Dyck et al. | 370/389 |
| 2009/0323771 A1 * | 12/2009 | Zhen et al. | 375/141 |
| 2011/0153641 A1 * | 6/2011 | Thorup et al. | 707/769 |
| 2011/0171970 A1 * | 7/2011 | Ishikawa | 455/456.1 |
| 2011/0182370 A1 * | 7/2011 | Shi et al. | 375/259 |
| 2012/0063335 A1 | 3/2012 | Cho et al. | |
| 2012/0066528 A1 * | 3/2012 | Hatambeiki et al. | 713/321 |
| 2012/0171954 A1 * | 7/2012 | Rudland et al. | 455/41.1 |
| 2012/0207232 A1 * | 8/2012 | Zhang et al. | 375/260 |

OTHER PUBLICATIONS

E. Shih et al "Wake on Wireless: An Event Driven Energy Saving Strategy for Battery Operated Devices", MOBICOM'02 (Sep. 2002).

L. Shang et al "Dynamic Voltage Scaling With Links for Power Optimization of Interconnection Networks", HPCA-9'03 (Sep. 2003).

W. Dieter et al "Power Reduction by Varying Sampling Rate", ISLPED'05 (Aug. 2005).

* cited by examiner

COORDINATION AMONGST HETEROGENEOUS WIRELESS DEVICES

CROSS-REFERENCE TO RELATED APPLICATIONS

This application is a continuation-in-part of U.S. patent application Ser. No. 13/439,900 filed on Apr. 5, 2012, which claims the benefit of U.S. Provisional Application No. 61/473,356 filed on Apr. 8, 2011. This application also claims the benefit of 61/754,162 filed on Jan. 18, 2013. The entire disclosure of the above applications are incorporated herein by reference.

FIELD

The present disclosure relates to coordinating communication amongst heterogeneous wireless devices.

BACKGROUND

The explosive growth of wireless and mobile networks continues proliferation of heterogeneous network devices on the unlicensed spectrum. These devices are often built on distinct PHY layers to serve specific types of applications, and hence cannot directly communicate with one another. For example, WiFi (or IEEE 802.11) and ZigBee (or IEEE 802.15.4) are often deployed in residential environments for mobile Internet access and home-area networking, respectively. Both share the 2.4 GHz ISM band, but adopt different modulation schemes and even different MAC protocols (Zig-Bee allows for TDMA). Heterogeneity may occur even in the same family of networks. For example, besides the standard 20 MHz bandwidth, WiFi has evolved to have 40 MHz bandwidth in 802.11n and 160 MHz bandwidth in 802.11ac to support high date-rate applications, in addition to the 802.11-2007 with narrower bandwidths (5 MHz and 10 MHz) supporting applications with low data-rate but high energy-efficiency. This trend towards heterogeneous MAC/PHY layers is likely to continue with the evolution of wireless networks.

Ideally, each network should independently manage its associated devices. Interference between different networks can be avoided with CSMA-style MAC protocols. However, network heterogeneity poses significant challenges on existing protocols. High-speed devices may preempt low-speed devices and cause severe collision even with CSMA enabled. Hidden terminals worsen the problem, since heterogeneous transmitters cannot exchange the RTS/CTS style signaling messages between them. Lack of a coordination mechanism also renders it infeasible to realize protocols that put the receiver in a narrower spectrum (i.e., lower sampling-rate) than the transmitter in order to save energy.

A straightforward way to enable coordination between heterogeneous network devices is to enforce a common modulation scheme and message format. However, this requires substantial modification to the PHY layers and loses the unique advantages of each device. For example, to enable ZigBee to decode a WiFi-modulated packet, it needs to increase the spectrum width and clock-rate, thus increasing the energy cost. On the other hand, WiFi loses its throughput advantage if it chooses to coordinate using a ZigBee-compatible PHY layer. Therefore, it is essential to develop a lightweight mechanism that does not require modification of the hardware and communication algorithms in existing devices.

This section provides background information related to the present disclosure which is not necessarily prior art.

SUMMARY

A computer-implemented method is proposed for coordinating communication amongst wireless communication devices in a wireless network. The coordination scheme creates a side channel between heterogeneous wireless devices to enhance their coordination.

At the transmitter, the coordination scheme appends a customized preamble to a data payload. The preamble is comprised of a sequence of energy pulses separated by a gap, where the duration of the gap encodes coordination data for the receive device.

At the receiver, the coordination scheme detects the preamble of the data packet; extracts the coordination data from the preamble of the data packet; and coordinates communication between the transmit device and the receive device using the coordination data.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

DETAILED DESCRIPTION

Figure 1:
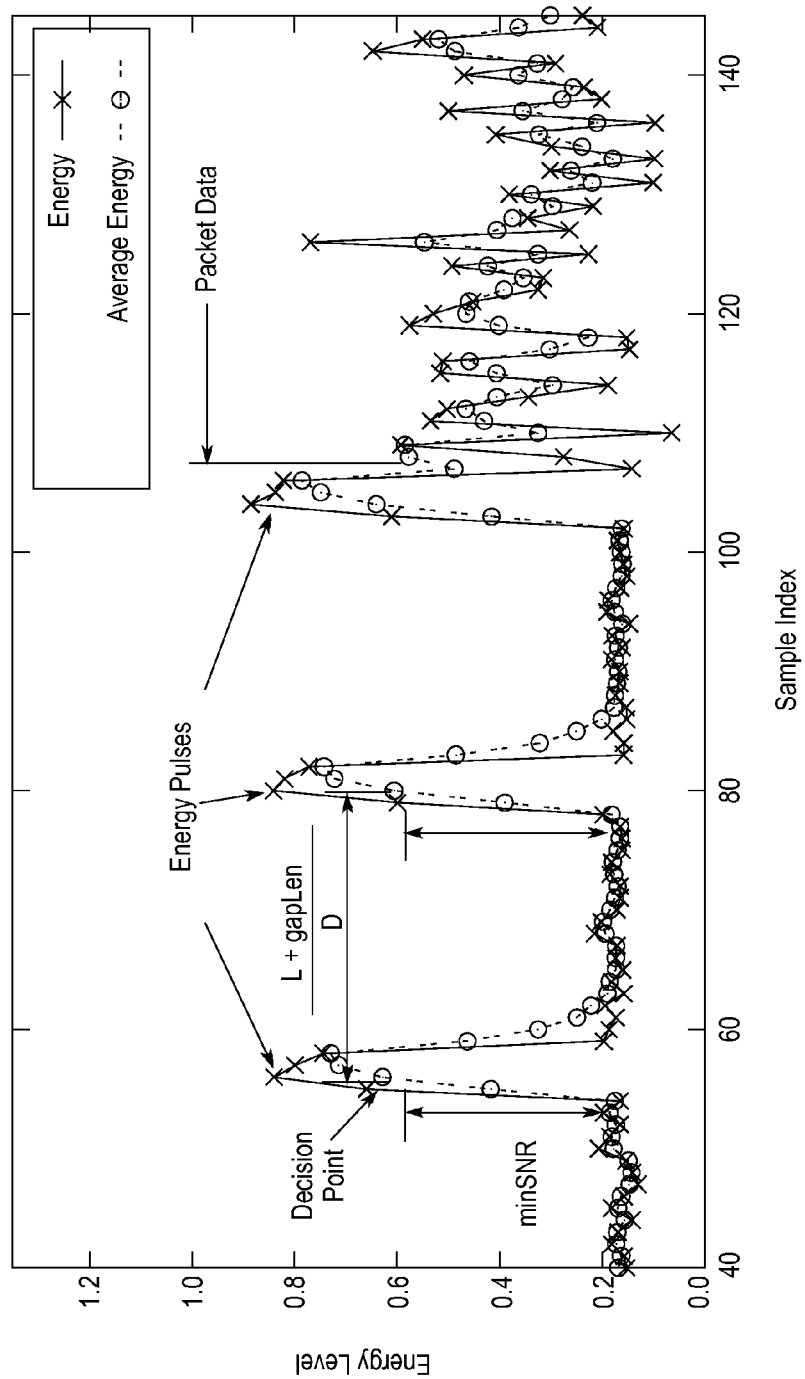
FIG. 1 is a diagram depicting an exemplary preamble appended to a data packet in accordance with a proposed coordination scheme.

Different network devices may have distinct PHY-layer profiles and MAC protocols. For example, WiFi runs CSMA, whereas ZigBee allows for TDMA operations to support real-time applications. Although WiFi will defer its transmission when it overhears ZigBee may dispatch its TDMA-scheduled packets during an ongoing WiFi transmission, thus causing collision. Collision may also occur due to the disparate time resolution of different devices. To reduce power consumption, ZigBee has a low clock-rate and a coarse time resolution of 320 µs, i.e., switching between states (carrier sensing, transmission and receiving) takes at least 320 µs. In contrast, WiFi has a fine resolution of 9 to 20 µs, and may complete a carrier sensing operation during the ZigBee's switching time, thus colliding with a ZigBee packet that follows immediately. Under moderate to high traffic load, such a collision occurs frequently, rending ZigBee's TDMA mode unusable. As a natural solution, ZigBee may inform WiFi of upcoming TDMA slots so that WiFi can temporarily defer its transmission. Such coordination can significantly reduce collision at a low cost of channel time, since ZigBee operates with a very low duty-cycle. But direct information sharing between WiFi and ZigBee is not possible due to their incompatible PHY-layer modulation/demodulation methods. It is thus preferable to create a lightweight side channel independent of the existing MAC/PHY modules.

Emerging WiFi standards allow for wider (40 MHz or 160 MHz) or narrower (5 MHz) spectrum widths than the standard 20 MHz channel. When two WiFi links with different bandwidths coexist and share part of the spectrum, the conventional message-exchange mechanisms cannot coordinate their transmissions. In particular, when hidden terminals exist in a 'homogeneous' network, a receiver can use the CTS (Clear To Send) message (containing the duration of an upcoming data packet) to reserve the channel, warning interferers who cannot hear the transmitter. But when the interferer has a different bandwidth and cannot communicate directly with the transmitter/receiver, the CTS scheme becomes ineffective. Hence, there is a need for a new coordination mechanism that is oblivious of the spectrum heterogeneity between network devices.

Conventional network protocols assume that the transmitter and the receiver can communicate only if their PHY-layer configurations (modulation/demodulation, sampling clock-rate, etc.) match. Recently, by relaxing this constraint and intentionally introducing heterogeneity, network performance is shown to improve substantially. Specifically, by down-clocking the radio during its idle listening, the receiver can reduce the dominating power consumption in idle listening. For such clock-rate management protocols, the key challenge is to trigger the receiver which is configured to a lower clock-rate than the transmitter. Again, the conventional message-exchange scheme is ineffective as the receiver cannot decode any notification packets from the transmitter. Therefore, the coordination mechanism should be oblivious to the sampling clock-rate used by different nodes.

In general, the coordination scheme creates a side channel between heterogeneous wireless devices to enhance their cooperation. The coordination scheme patches legacy packets with a customized preamble, which is sent directly as raw samples together with the modulated data payload. The receiver exploits the energy level of incoming signals (provided by the RSSI module) to identify the preamble and the coordination information therein. Note that the preamble only serves as a primitive for conveying limited units of information. It is up to the MAC or application protocol to determine the mapping between the preamble's format and the actual coordination information.

On the transmit side, the customized preamble is constructed by the transmit device and appended to data packets transmitted across a wireless network. In one exemplary embodiment, the preamble is comprised of multiple energy pulses quiet periods (i.e., gaps) in between the pulses as shown, for example in FIG. 1. The preamble is designed in a way to maximize the SNR and hence the detection probability, while ensuring sufficient capacity to contain the coordination information.

The energy pulses are a sequence of raw data samples (complex numbers). The sequence must be sufficiently long so as to be detectable by a heterogeneous receiver. This is particularly important when the receiver has a lower sampling clock-rate (or narrower bandwidth) than the transmitter. Suppose transmitter's sampling clock-rate is D times that of the receiver's, then each energy pulse must contain at least D samples, such that at least one of them can be received. That is, each energy pulse has a fixed length and that length is larger than the ratio of clock rate of the transmitter to the clock rate of the receiver.

However, the energy pulse should not be too long either; otherwise, the receiver may confuse it with legacy packets. On the ISM band, legacy network packets consist of a header (used for synchronization between transmitter and receiver) and payload. So, their duration is at least larger than the header duration (e.g., 160 µs, 100 µs and 8 µs, for Bluetooth, ZigBee and WiFi, respectively). When constructing an energy pulse, the transmitter ensures it is shorter than the minimum of the header durations in co-existing networks.

A gap is simply a sequence of zeros in the preamble. Similar to the energy pulses, the minimum gap length must be larger than D, the ratio of spectrum width (or sampling rate) between the transmitter and the receiver. On the other hand, it should be shorter than the carrier sensing duration of neighboring CSMA devices; otherwise, these devices may deem the gap as a hint for an idle channel and start transmission, thus colliding with subsequent energy pulses. The carrier sensing duration is well defined in existing CSMA networks (e.g., 128 µs for ZigBee, and 28-50 µs for WiFi), and the minimum of them is used as the upper-bound of gap duration. The maximum gap length (i.e., the maximum number of discrete samples) equals the maximum gap duration divided by the transmitter's sampling period.

In digital communication systems, sequences of bits are intentionally randomized to improve the accuracy of channel estimation. Existing correlation-based packet detection algorithms also require the sequence of bits in the preamble to be randomized (e.g., as in the 802.11 preamble), so that a correlation peak can be identified only if the sequence matches a known pattern. However, in this coordination scheme, a deterministic sequence is needed in order to maximize the SNR of energy pulses.

To see this, suppose $$d[n](n \in \left[-\frac{N}{2}, \frac{N}{2}\right],$$

N is the pulse length, an even number) are the samples in the pulse emitted from the transmitter. After going through the RF front-end at the receiver, at time t, the signal involves noise and a composite of residual signals from other time instances:

$$r(t) = n(t) + \sum_{n=-N/2}^{N/2} d[n] \cdot h(t - nT_s) \quad (1)$$

where $T_s$ is the sampling period, n(t) the noise signal and h(x) the channel transfer function at time x. After the ADC, the k-th digital sample can be expressed as:

$$r[k] = n(k) + \sum_{n=-N/2}^{N/2} d[n]h[k-n] \quad (2)$$

$$= n(k) + d[k]h[0] + \sum_{n \neq k} d[n]h[k-n]. \quad (3)$$

When d[n] is a random bi-polar sequence (assuming elements are randomly chosen from 1 and −1), the resulting SNR is:

$$\frac{|h[0]|^2}{\sigma^2 + \left|\sum_{n \neq k} d[n]h[k-n]\right|^2} \quad (4)$$

where σ2 is the noise variance. The second term in the denominator represents the interference caused by other samples in the preamble. Due to the multipath effect, the tail of each sample can smear into adjacent samples with opposite phases, thereby weakening the signal strength and degrading detection performance. In contrast, if d(k) is the deterministic sequence, i.e., $$d[n] = d[m] \left(\forall\, m, n \in \left[-\frac{N}{2}, \frac{N}{2}\right]\right),$$

m≠n, then the SNR:

$$\frac{\left|h[0] + \sum_{n \neq k} h[k-n]\right|^2}{\sigma^2} > \frac{|h[0]|^2}{\sigma^2} \quad (5)$$

which is larger than SNR in the random case (4). The inequality (5) holds because the channel transfer function is unlikely to undergo abrupt phase changes within the short period of one energy pulse.

Once two consecutive energy pulses are detected, the gap between them can be determined according to how many digital samples the receiver counted in between the pulses. Multiple energy pulses can be concatenated, and each of the corresponding gaps represents one field of information, which is customizable by the application.

The gap length can be mapped to various control or coordination information, depending on the objective of higher-layer protocols. For example, it can be directly mapped to a transmitter's spectrum width and a receiver's address, such that a transmitter can trigger a specific receiver even if it is operating on a narrower bandwidth. More examples of its applications are contemplated by this disclosure, a few of which are further described below.

Although the approach of gap sending masks PHY-layer heterogeneity, it has low communication efficiency, and is thus applicable only if its low-efficiency is tolerable by the higher-layer protocols. Suppose the maximum gap length is $G_m$ samples, then up to $\log_2 G_m$ bits of information can be delivered in each gap. With a sampling rate of F Hz, the resulting information capacity is $$\frac{\log_2 G_m}{G_m F} = F G_m^{-1} \log_2 G_m \text{ bit/s}.$$

The capacity increases linearly with sampling rate F, but decreases with gap length. Hence, a wider gap may waste more channel resources, albeit more bits can be delivered. Therefore, this coordination scheme is particularly suitable for delivering low-rate control/coordination information.

Figure 2:
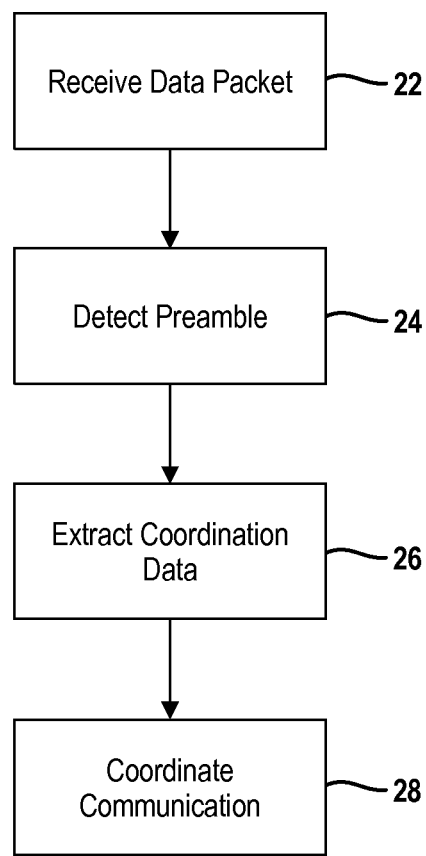
FIG. 2 is a flowchart depicting an overview of an exemplary detection technique used to coordinate communication amongst wireless communication devices in a wireless network.

FIG. 2 provides an overview of the coordination scheme as implemented by the receiver. Upon receipt of a data packet at 22, the receiver first detects the preamble in the data packet. Coordination data is then extracted at 26 from the preamble of the data packet. Methods for detecting the preamble and extracting the coordination data are further described below. Lastly, the coordination data may be used at 28 by the receiver to coordinate communication with the transmitter of the data packet.

The preamble can be detected despite the physical-layer heterogeneity between the transmitter and the receiver. Suppose the receiver's sampling rate is $R_r$ and the transmitter's $DR_r$. With a deterministic sequence at the transmitter, the corresponding received energy pulse is:

$$r[k] = n(k) + h\left[k\frac{DR_r}{R_r}\right] = n(k) + h[kD] \quad (6)$$

The energy pulse spans a short period (on the order of microseconds), so the channel transfer function remains relatively stable, i.e., h[kD]≈h[k]. Consequently, the receiver can detect the same level of energy even if it downsamples or upsamples the incoming signals. FIG. 1 illustrates an example set of signal traces and the detection procedure, with D=16.

When constructing the preamble, the deterministic sequence uses a complex number A+Aj for each sample, where A is the maximum signal amplitude for the radio. An exemplary technique for constructing the preamble is set forth below.

```
/*Transmitter: preamble construction*/
For each gap field
    /*Insert energy pulse with length L */
    for k = 1 to L
        s(k) = A + Aj
    endfor
    for k = L +1 to L + gapLen
        s(k) = 0
    endfor
endfor
```

Figure 4A:
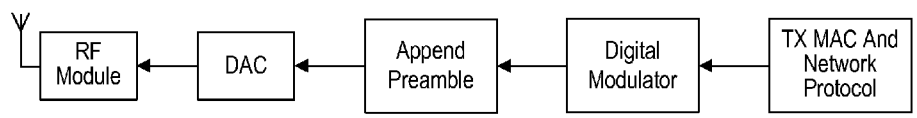
FIGS. 4A and 4B are block diagrams illustrating how the coordination scheme can be integrated into a transmit device and receive device, respectively.

This technique may be integrated into existing radio devices without modifying their modulator as shown in FIG. 4A. In one embodiment, this technique is implemented by computer-readable instructions executed by a computer processor of the transmit device. Other techniques for constructing the preamble also fall within the broader aspects of this disclosure.

Figure 3:
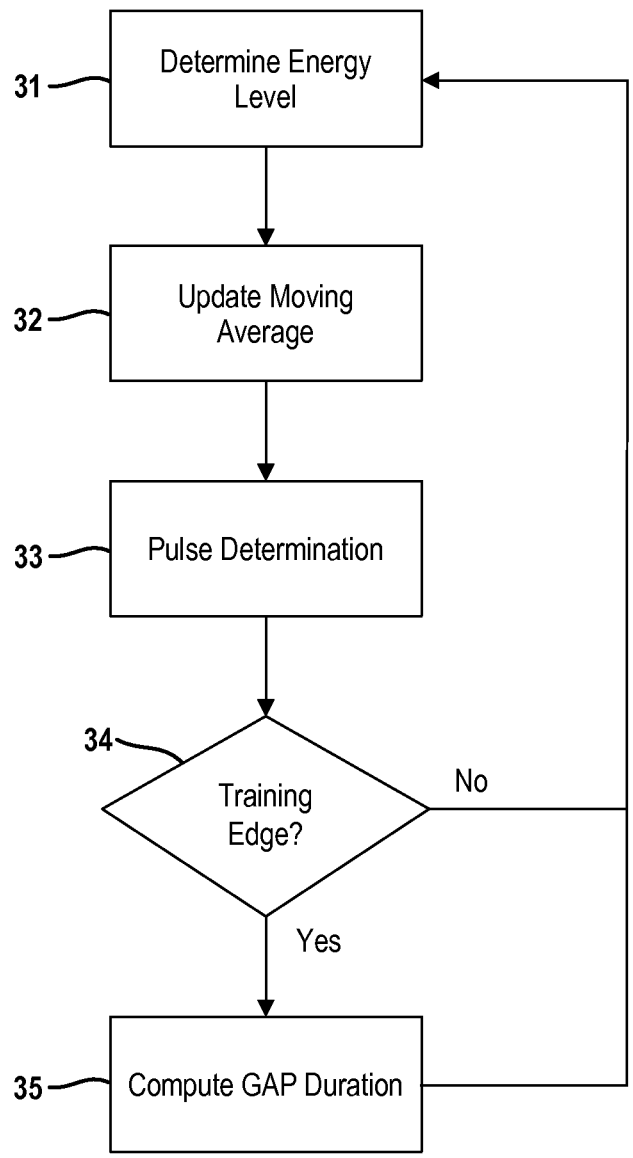
FIG. 3 is a flowchart depicting an exemplary technique for detecting a preamble at the receiver.

FIG. 3 further depicts an exemplary technique for detecting a preamble by the receiver. At the receiver, an incoming data signal is sampled in a known manner to yield a plurality of data samples. The detection technique identifies the energy pulses using level detection and declares a pulse only if multiple samples (H1 fraction of an ideal energy pulse) with sufficient SNR are detected, which is more reliable than edge detection.

Due to noise and fading effects, the received energy pulse no longer retains sharp edges, which causes variation of gap length and degrades the reliability of coordination. To solve this problem, the detection technique first smoothes the incoming signals' energy level with a moving average, with the window size equal to the minimum gap length. To do so, the energy level for each data sample is determined at 31. The energy level for the current sample is in turn used at 32 to update the moving average maintained for data samples which fall within the window. In one exemplary embodiment, the moving average is further defined as an exponential moving average although other types of averages are contemplated by this disclosure. In addition, the coordination scheme ensures that each energy pulse contains the same sequence of raw samples. This way, each transition from gap (or noise floor) to energy pulse shows a similar pattern, and the detected starting times of adjacent pulses have the same deviation from the true edges (as seen in FIG. 1).

Next, a determination is made at 33 as to whether the current data sample is part of an energy pulse. To determine whether a current sample is part of an energy pulse, a signal to noise ratio is computed using the moving average and compared to a noise threshold. The current sample is deemed to be part of the energy pulse (i.e., assigned a value of one) when the computer signal to noise ratio exceeds the noise threshold; otherwise, the current sample is assigned a value of zero. To detect the energy pulses, a fixed threshold minSNR is used, which is the minimum detectable SNR (e.g., 3 dB). Below this SNR level, the packet demodulation also fails for existing links, and inter-device coordination is unnecessary. An important feature of the detection algorithm is that this detection threshold need not be adapted to the radio environment. In addition, for each time stamp k, only a fixed number of operations are needed, thus the detection algorithm has a linear complexity.

Given the classified data samples, edge detection is performed at 34. In an exemplary embodiment, a trailing edge is detected for each energy pulse. Upon detection a trailing edge, the gap length is determined as shown at 35 and processing continues with the next data sample. Likewise, processing continues with the next data sample when a trailing edge is not detected. The detection decision tends to be made at the same position of consecutive energy pulses and hence the gap length can be computed by subtracting the known pulse length from the inter-pulse period. Other techniques for determining gap length are also contemplated by this disclosure.

Psuedocode for the exemplary detection technique is set forth below.

```
/*Receiver: preamble detection*/
/*Energy level of incoming signal at time stamp k*/
e(k) ← |r(k)|²
```

/*Update average energy level, $\beta = \frac{1}{\text{minGapLen}}$ */

```
a(k) ← βe(k) + (1 − β)a(k)
/*Collect sufficient high SNR samples to decide on a pulse*/
```

If $10 \log_{10} \frac{a(k)}{a(k - L/D)} > \text{minSNR}$

```
    decisionQ ← push 1
else decisionQ ← push 0
endif
/*Edge detection of energy pulse*/
```

If $\text{sum}(\text{decisionQ}) > H_1 \cdot \frac{L}{D_m}$

```
    If minGapLen/D ≤ k − lastPulseEdge ≤ maxGapLen/D
    /*Pulse detected. Determine gap length*/
        gapLen = k − lastPulseEdge − L/D
    endif
    lastPulseEdge = k;
endif
```

Figure 4B:
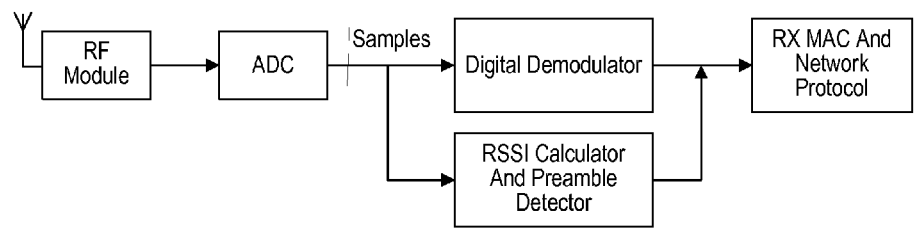

This technique may be integrated into existing radio devices without modifying their modulator as shown in FIG. 4B. In one embodiment, this technique is implemented by computer-readable instructions executed by a computer processor of the receive device. Other techniques for detecting the preamble also fall within the broader aspects of this disclosure.

Figure 5:
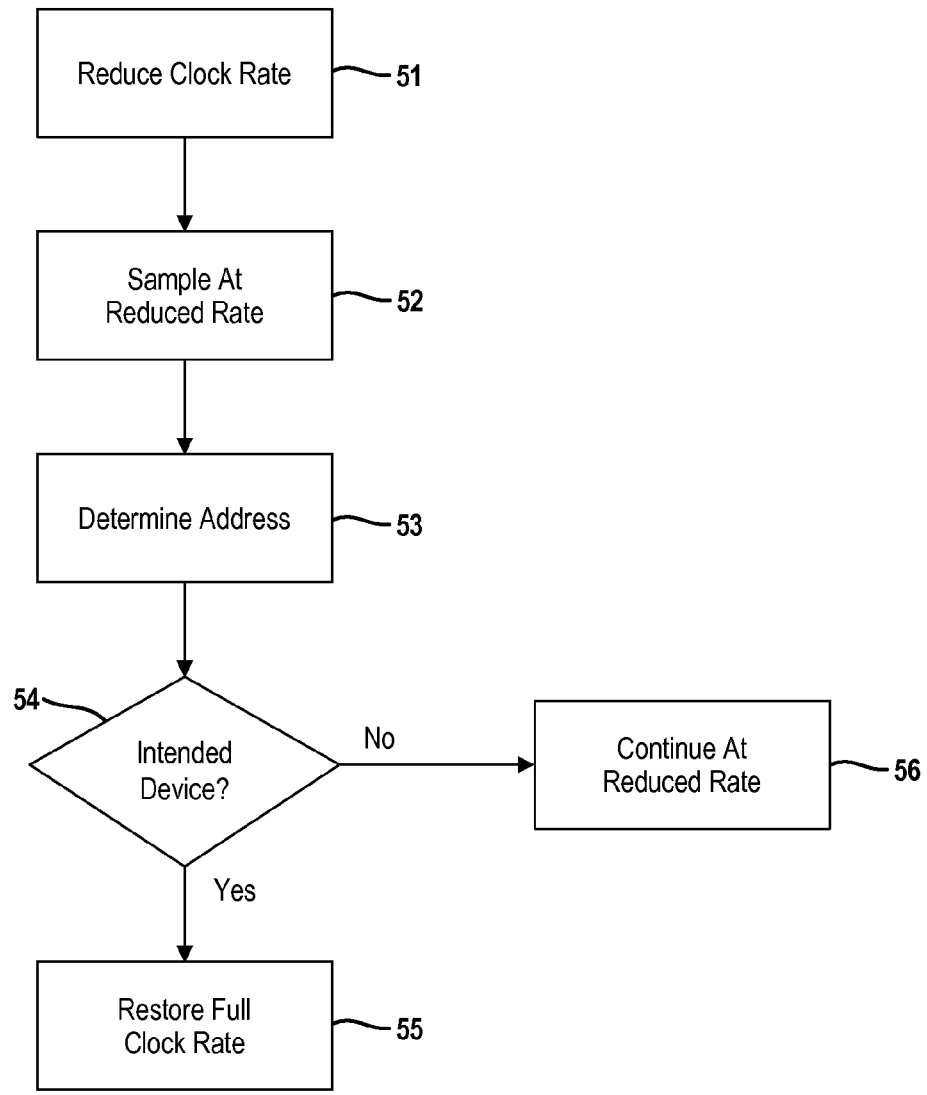
FIG. 5 is a flowchart depicting a method for reducing power consumption in wireless communication devices using the coordination scheme.

FIG. 5 illustrates a method for reducing power consumption in wireless communication devices using the coordination scheme set forth in this disclosure. During an idle listening period, the clock rate of the receiver in the device is reduced as indicated at 51. Data packets received by the receiver are then sampled at 52 at the reduced clock rate. A determination is made at 54 as to whether the data packet is intended for the device. In one embodiment, the determination is made using the receiver address encoded in the data packet in accordance with the coordination scheme set forth above. The clock rate is restored at 55 to the full clock rate when the data packet is intended for the device. On the other hand, the receiver continues to operate at the reduced clock rate at 56 when the data packet is not intended for the device. Thus, the clock-rate is controlled on a fine-grained per-packet basis, in order to reduce the energy consumption of idle listening. It opportunistically downclocks the radio during idle listening, and then restores it to full clock-rate before transmitting or after detecting a packet.

In one implementation, the coordination scheme was built on the GNURadio library. GNURadio provides the driver interface to the USRP2 software radio, which delivers modulated packets together with the coordination scheme preamble over its RF front-end. The receiver terminal, a USRP2 node, down-converts the incoming signals to the baseband, quantizes them into discrete complex samples, and then delivers the samples to a personal computer (PC) via Ethernet. The PC continuously runs the coordination scheme detection algorithm and extracts the gap length information from preambles.

Experiments were conducted in an indoor office environment with obstacles (concrete walls, server racks, etc.) which create rich multipath reflections. To incorporate the effects of interference from non-coordination scheme devices, the radio's center frequency is configured to 2.452 GHz, a channel shared with ambient WiFi networks.

Mis-detection and false-alarm probabilities of the coordination scheme were evaluated under various SNR levels. As a benchmark, algorithms described in U.S. patent application Ser. No. 13/439,900 were also implemented and are referred to here as the E-MiLi algorithm. The E-MiLi algorithm exploits the self-correlation between consecutive random sequences to detect a preamble. In the experiments, SNR is measured by the mean energy level of an energy pulse over the noise floor preceding it. Different SNR values are created by varying the link distance and the signal amplitude (the parameter A in the algorithm above). The device heterogeneity is represented by D, the ratio of transmitter's sampling rate to the receiver's. By default, the transmitter sends 3000 preambles per second, each followed by random samples representing the packet payload. The pulse length (L) is set to 64, and the minimum detectable SNR (minSNR) to 4 dB.

Figure 6A:
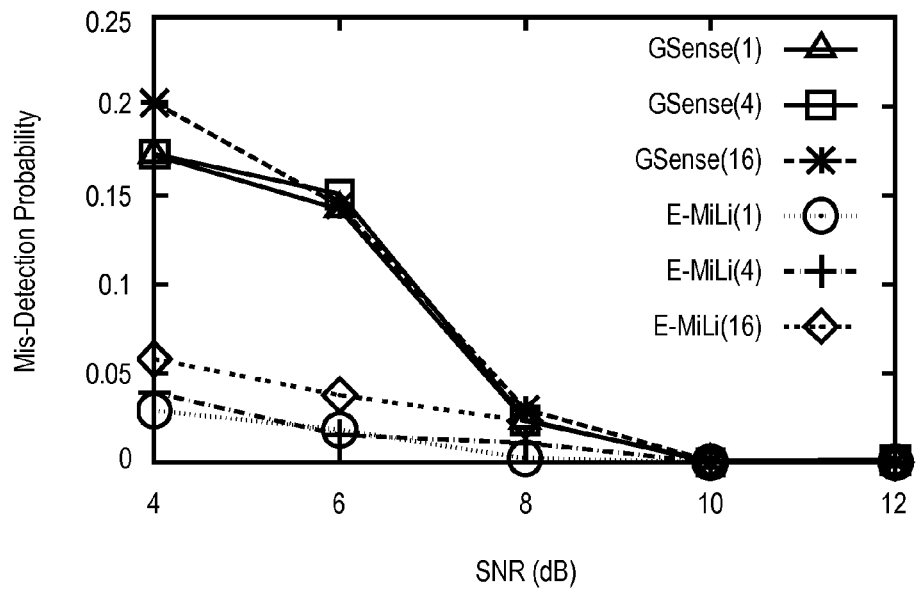
FIGS. 6A and 6B are graphs showing the mis-detection probability and false alarm probability, respectively, as a function of signal to noise ratio.

In one case, the receiver needs to detect the address information embedded in one preamble gap. The E-MiLi algorithm is configured to achieve the same objective, but using a longer preamble (3 repetitions of the same random sequence). FIG. 6A shows the mis-detection probability as a function of SNR and the spectrum heterogeneity. Compared to E-MiLi, the coordination scheme of this disclosure shows a higher mis-detection rate at low SNR (below 8 dB). This is because the pulse detector is more susceptible to noise corruption and the fading effects, which occasionally reduces the SNR of energy pulses to below the minSNR. E-MiLi's preamble and the self-correlation based detector tends to maintain the self-correlation feature even under a low SNR. The downside of E-MiLi is that it incurs higher computational complexity, and the correlation operation is not natively supported by legacy radios.

In most common cases, wireless networks operate in high SNR region to ensure a high packet delivery ratio. For OFDM-based wireless networks, around 7 dB of SNR is needed to achieve the lowest bit rate (with BPSK modulation), and most existing wireless links have a much higher SNR than the lowest margin in order to combat the uncertainty caused by fading. For DSSS-based networks, such as 802.15.4 and 802.11b, at least 10 dB of SNR is needed to maintain low packet-loss rate. Within such high SNR regions, the coordination scheme achieves a close-to-zero mis-detection rate. More importantly, its detection performance is insensitive to the spectrum heterogeneity, and can thus serve as a reliable means of inter-device coordination.

Figure 6B:
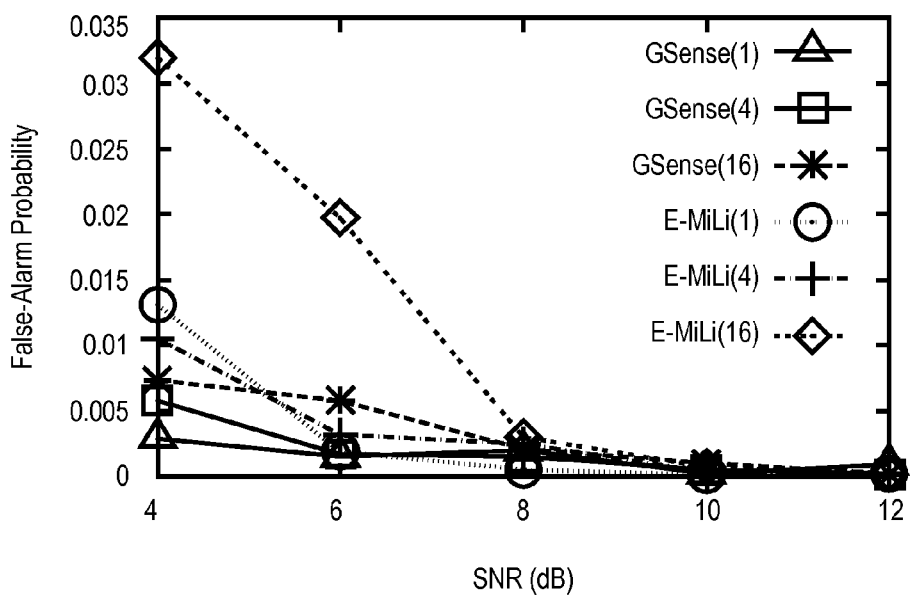

With respect to the false-alarm probability (FIG. 6B), it can be seen that the coordination scheme consistently achieves below 1% error even under low SNR, which is even superior to E-MiLi. This is essentially due to its implicit gap length constraint: a gap is declared only if two consecutive energy pulses are identified, with a separation between the minimum and maximum gap lengths. It is rare to find such cases that are falsely created by noise.

Figure 7A:
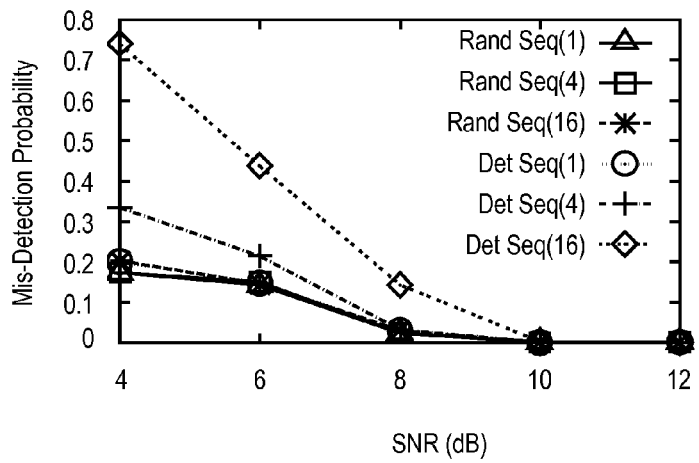
FIGS. 7A and 7B are graphs showing the mis-detection probability and error probability, respectively, as a function of signal to noise ratio for a random sequence.

To validate the importance of a deterministic sequence in the coordination scheme, we compared it with a scheme that uses randomly generated energy pulses (the real and imaginary components in each sample is randomly chosen between A and −A). FIG. 7A shows the resulting mis-detection rate, where each SNR value corresponds to the same signal amplitude and link distance for both schemes. The random scheme suffers from a sharp rise of mis-detection rate, with up to 14% at 8 dB and 73% at 4 dB. It is also more vulnerable to the spectrum heterogeneity: detection performance may differ by multiple folds with different spectrum widths or sampling rates. Therefore, to achieve high detection accuracy, a deterministic sequence should always be used to generate the energy pulses for the coordination scheme.

Figure 7B:
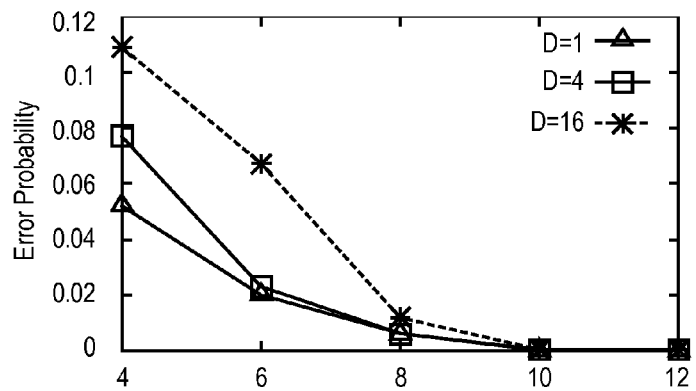

Since the coordination scheme uses gap length to convey meaningful information, it is important to assess the probability that one gap value is mistaken as another. FIG. 7B shows that the error probability is close to 0 with above 10 dB SNR, around 1% at 8 dB SNR, and increases sharply when SNR is below 8 dB. Therefore, application protocols can employ the coordination scheme reliably at high SNRs, but use it with caution when SNR is below 8 dB.

In this section, the coordination scheme is used to design three prevalent protocols that coordinate heterogeneous network devices, in order to reduce interference and improve energy-efficiency. The coordination preamble for ZigBee networks is designed, so that they can notify coexisting WiFi about forthcoming TDMA packets, thereby preventing the two types of collision due to lack of coordination.

The unique characteristics of ZigBee allow Coordination scheme to realize such coordination at low overhead. ZigBee has a periodic frame structure. Each frame starts with a beacon sent by a coordinator node, followed by a number of contention-free slots with a fixed duration, in which TDMA packets can be delivered between the coordinator and clients [2]. CSMA packets may also be delivered afterwards, but are beyond the scope of this work.

Figure 8:
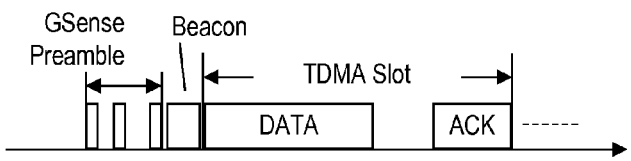
FIG. 8 is a diagram illustrating the preamble in the context of ZigBee.

To enable the coordination, it is sufficient for ZigBee to send a bootstrap coordination scheme preamble containing general information about its schedule, and then periodic preambles before each frame of TDMA slots comes. FIG. 8 illustrates the basic operations. In the bootstrap stage, the coordination scheme preamble contains 3 fields, indicating (i) type of preamble (i.e., a bootstrap preamble), (ii) the TDMA slot duration (in the unit of ZigBee time slot, i.e., 320 μs), and (iii) number of TDMA slots in each ZigBee frame. The bootstrap preamble is sent proactively. It is triggered only when ZigBee experiences high interference (indicated by unusually high packet losses). It may be repeated to ensure reliable delivery to WiFi interferers, and reinitiated if parameters in its information fields change.

After the bootstrap, a notification preamble is sent before each frame, warning WiFi about the forthcoming beacon and TDMA slots. The notification preamble comprises consecutive energy pulses with the same gap length that is known to both WiFi and ZigBee. The number of pulses (i.e., the preamble length) should be adjusted to strike a balance between the overhead and performance (i.e., collision-rate reduction). If it is too long, it may waste too much channel time; otherwise, the WiFi transmitter may be in the middle of a transmission and miss the coordination scheme preamble before the ZigBee's TDMA frame starts, thus causing collision. To resolve this dilemma, the ZigBee node can increase the preamble length gradually until the observed collision-rate is tolerable.

It should be noted that the preamble is sent without carrier sensing and may still collide with ongoing WiFi transmissions. However, ZigBee applications typically have low date rate and low duty cycle (below 1%), so the collision events occur infrequently, and WiFi can easily recover from collision with MAC-layer retransmissions.

Following the 802.15.4 specification, a TDMA module is developed in ns-2, in addition to the existing CSMA library for ZigBee. The coordination preamble scheduling and transmission schemes of this disclosure are built on top of this module. By default, the coordination scheme uses a preamble length (number of energy pulses) of 5. To avoid WiFi confusing the gap with an idle period, the gap length between adjacent energy pulses is set to 49 μs, below the required 802.11g carrier sensing duration (the DIFS). The ns-2 PHY layer is modified by incorporating the empirical noise floor and preamble detection rate from test bed measurement. An empirical propagation model (defined by the 802.15 group) is used for calculating the received signal power. The experiment focuses on a benchmark scenario with a WiFi link and ZigBee link, each of 10 m length, and the transmitters are separated by 10 m. WiFi uses a standard power level of 15 dBm and ZigBee 0 dBm. Without loss of generality, ZigBee uses one TDMA slot per frame, and one beacon is sent every 100 ms. WiFi runs an 802.11g UDP file transfer, with a data rate of 12 Mbps and packet size 1 KB.

Figure 9:
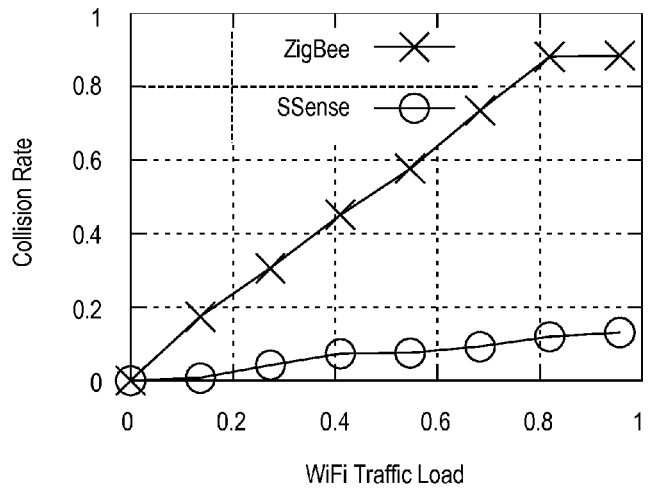
FIG. 9 is a graph showing the collision rate when ZigBee coexists with WiFi.

FIG. 9 plots the collision rate under various WiFi traffic rates (application throughput normalized by data rate). The collision rate rises sharply as traffic rate increases until the WiFi link becomes saturated. With a moderate traffic of 0.4, the collision rate goes up to 45%, whereas with the coordination scheme, the collision rate is below 8%. Even when WiFi traffic is saturated, the coordination scheme suffers around 10% of collision, 88.9% lower than the legacy ZigBee protocol.

Figure 10:
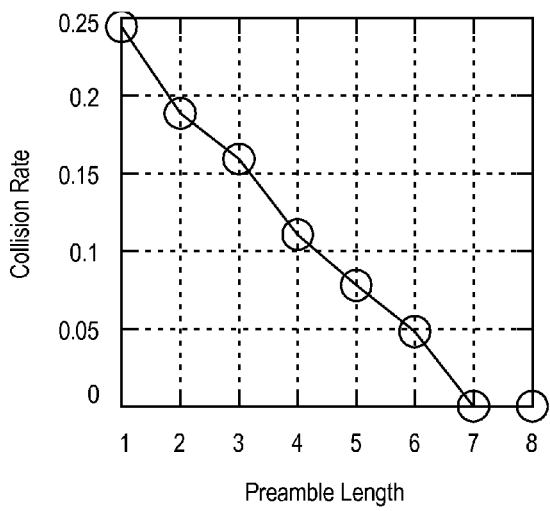
FIG. 10 is a graph showing the collision rate as a function of preamble length.

FIG. 10 shows the effects of preamble length. When a single energy pulse is used, the preamble may still collide with ongoing WiFi transmissions. But the collision hazard decreases as more energy pulses are incorporated. With a preamble length of larger than 7, the collision probability is reduced to close to 0. Note that this preamble length is equivalent to less than 11 bytes of ZigBee frames, whereas a ZigBee frame may contain multiple TDMA slots of hundreds of bytes of data. Hence, the overhead of the coordination scheme is negligible, considering the fact that it can eliminate the risk of losing TDMA data and ACK packets due to WiFi collision.

Figure 11:
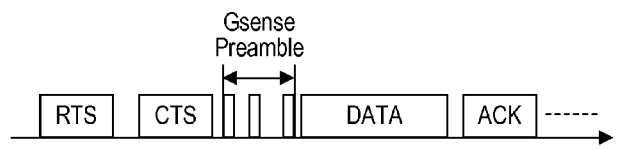
FIG. 11 is a diagram illustrating how to append a preamble in the context of a RTS/CTS mechanism.

The coordination scheme is employed to prevent the collision due to hidden terminals with heterogeneous spectrum widths. Before delivering the data payload, the transmitter sends an RTS (Request To Send) and the receiver replies with a CTS. Interferers with the same spectrum width can easily decode the CTS as in the legacy 802.11 protocol. In order to deliver the CTS information to the hidden terminal with different bandwidth, a coordination scheme preamble is appended to the CTS as an implicit coordination message (FIG. 11).

The preamble contains multiple gaps, representing similar information as a legacy CTS, including data rate and packet size which is used to calculate the duration of transmission such that the hidden terminal can set its NAV and defer its transmission. The data rate can be represented by its modulation order. For 802.11a/g/n, the lowest order 1 corresponds to 6 Mbps, and a maximum of 32 modulation orders are available. Observing that the maximum packet size is 1500 bytes, the packet size can be represented by 4 gaps, each corresponding to one decimal digit of its value. Thus, the maximum gap overhead is (32+1+9+9+9)=60 samples. Consider the coexistence of 802.11n and 802.11a/g, the maximum spectrum heterogeneity is 40 MHz/5 MHz=8. The energy pulse length should be at least 8 (we use a larger value of 16 to improve reliability). So, the total preamble overhead is (60×8+16×5=560) samples. At 40 MHz, the preamble lasts for 14 µs, which is even shorter than the 802.11 preamble (20 µs, which is even shorter than the 802.11 preamble (20 µs), and costs negligible channel time compared to the data payload.

Figure 12:
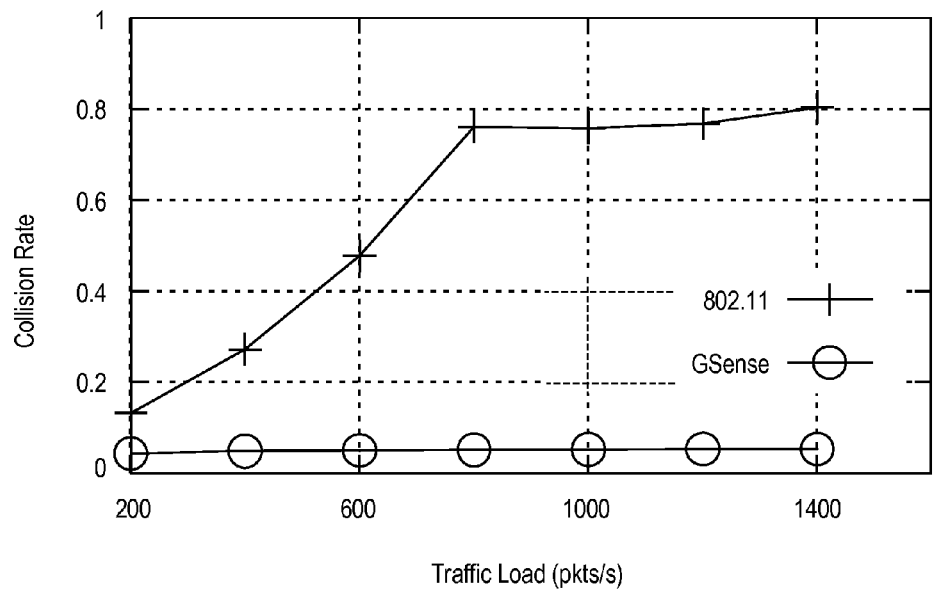
FIG. 12 is a graph showing the collision rate in relation to traffic loads.

The coordination scheme above is implemented on the ns-2 simulator and evaluated for a benchmark scenario with two links, running over 20 MHz and 40 MHz spectrum, respectively (FIG. 2). The transmitters cannot sense each other, and collision occurs at the 200 MHz receiver whenever their packets overlap in time. Both transmitters send UDP packets following a Poisson model. A conservative SNR of 8 dB is assumed for Coordination scheme, corresponding to a mis-detection rate of 5%. FIG. 12 shows that for legacy 802.11 nodes, the packet collision probability increases sharply with the traffic rate (up to 0.8 when the traffic becomes saturated). With the coordination scheme, collision is reduced to as low as its mis-detection rate. Note that the actual benefits of the coordination scheme depend on the fraction of hidden terminals in the network. An adaptive protocol may enable the coordination scheme only when a heterogeneous hidden terminal is suspected to exist.

In adaptive clock-rate management protocols, the idle receiver is allowed to operate at a lower clock-rate than the transmitters. A coordination scheme is needed that triggers the receiver to restore its clock. Since this coordination scheme can effectively coordinate the transmitter and the receiver even when they use heterogeneous sampling rates, it can be easily adopted as an enabling technique.

To this end, the transmitter needs to prepend the coordination scheme preamble to each legacy packet, with the gap length denoting the intended destination address. A receiver remains in down-clocked mode if no preamble is detected, and restores its radio to full clock-rate whenever a coordination scheme preamble is identified and matches its address.

Figure 13:
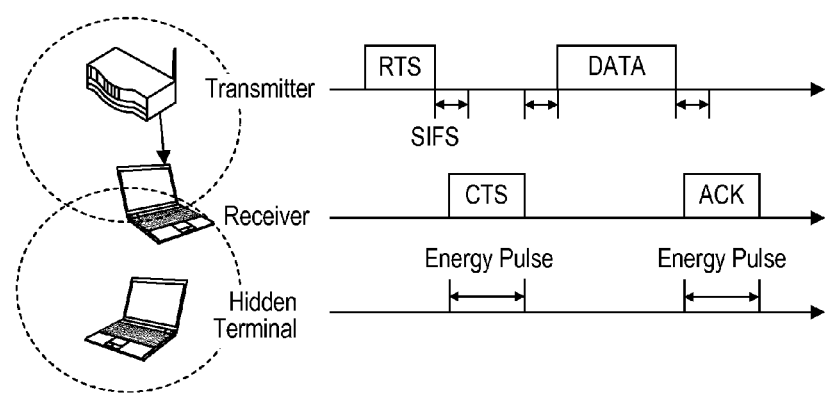
FIG. 13 is a diagram illustrating how a downclocked radio can detect a legacy data packet.

This mechanism is similar to the E-MiLi protocol, but is simpler for implementation as it can leverage the built-in energy sensing module in legacy radio devices. In addition, the coordination scheme makes it possible to design an 802.11-compatible virtual carrier sensing mechanism, which is critical for reducing collisions in the presence of hidden terminals. FIG. 13 shows how a downclocked radio can detect the legacy CTS packet using the coordination scheme, without appending any customized preamble. Coordination scheme treats the CTS packet as an energy pulse with a known duration, since it has a fixed size of 14 bytes and is always sent with the lowest modulation rate. After detecting the CTS, the hidden terminal defers its transmission until it detects an energy pulse corresponding to the ACK (or NACK, which should be sent if the receiver failed to decode the data payload). This mechanism can effectively enable the virtual carrier sensing of hidden terminals configured to different sampling rate, but is infeasible for E-MiLi, which uses a correlation-based detector and needs a customized preamble for every packet.

Figure 14:
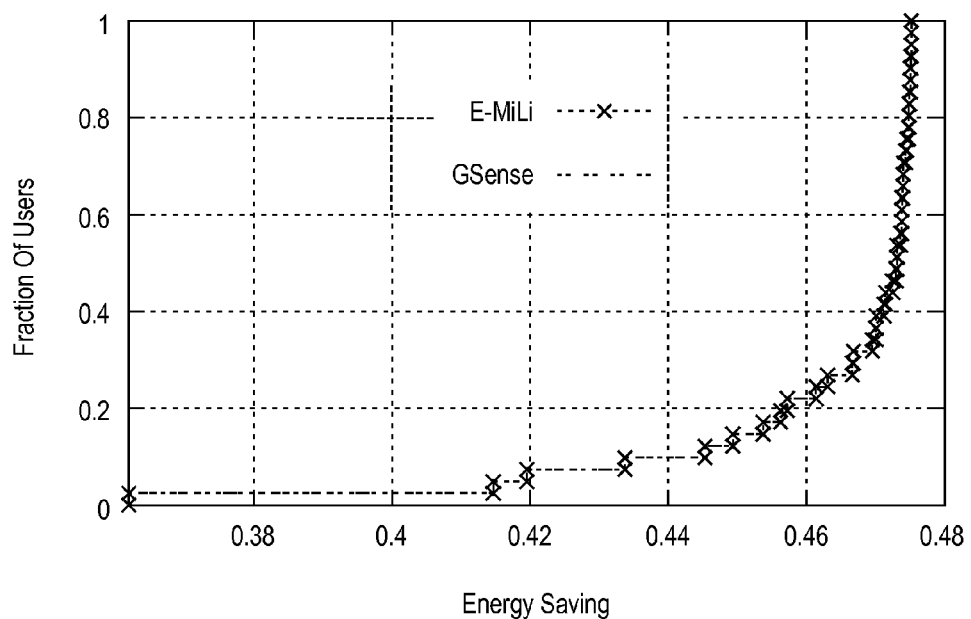
FIG. 14 is a graph showing the energy savings achieved by the proposed coordination scheme.

A trace-driven simulation is used to verify the above mechanism. The traces are obtained from a public network with a maximum (average) of 31 (7) users. The same energy consumption profile is used as the E-MiLi experiments, assuming a conservative SNR level of 8 dB for the wireless links. The corresponding detection statistics from the test bed measurement are then fed into the trace-based simulator. The results (FIG. 14) show that the coordination scheme of this disclosure can save about 44% of energy for more than 90% of clients. Although the coordination scheme has a higher mis-detection rate than E-MiLi, the energy savings is almost the same. The idle listening accounts for 90+% of the energy consumption for most WiFi clients. Thus, the extra energy cost due to mis-detection and retransmission is negligible compared to the savings in idle listening.

Figure 15:
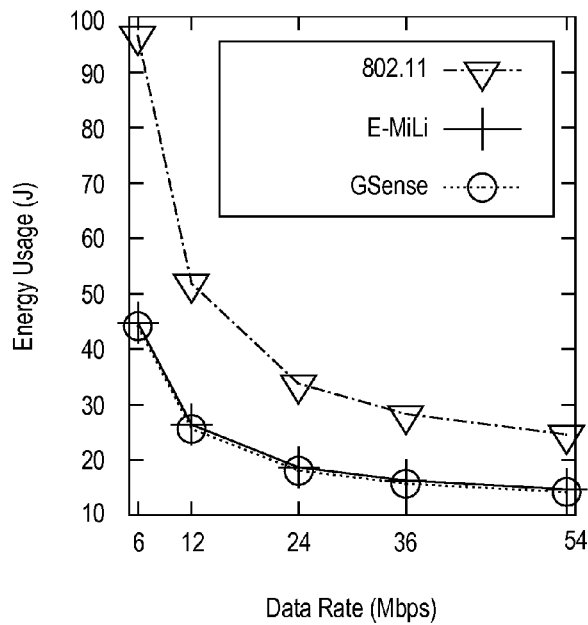
FIG. 15 is a graph showing energy consumption of various communication protocols.
Figure 16:
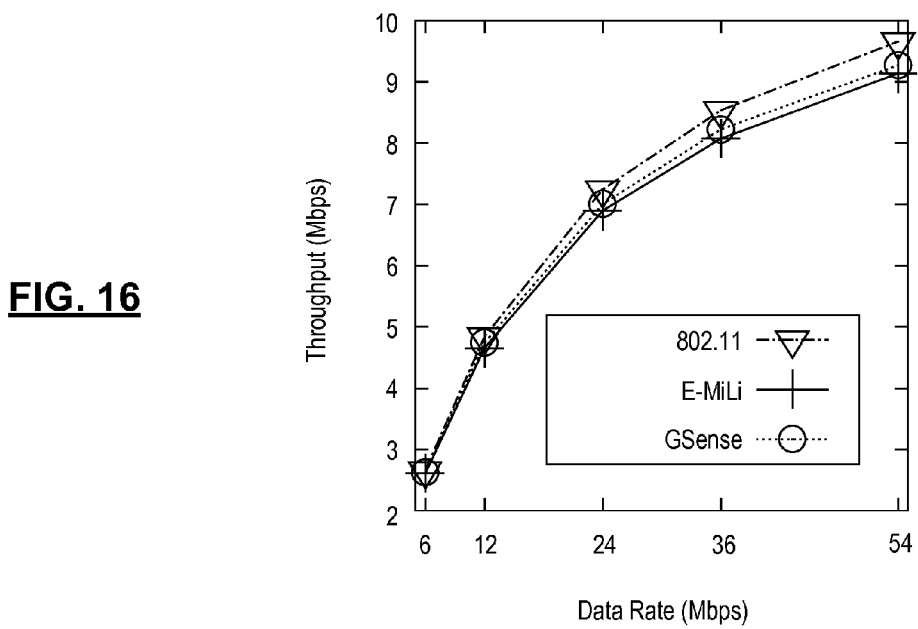
FIG. 16 is a graph showing throughput of various communication protocols.

The performance of Coordination scheme in ns-2 is further evaluated under various data-rates, which reflects the relative radio between preamble overhead and payload. Here the transmitter sends a 20 MB file to the receiver via FTP. The switching time between a low/high clock rate is set to 9.5 µs. FIGS. 15 and 16 plot the resulting energy-savings and throughput, respectively. Coordination scheme achieves the same amount of energy-savings as E-Mi-Li under various data-rates, ranging from 23.1% to 44%. As the data-rate increases, both this coordination scheme and E-MiLi incur throughput degradation due to the preamble overhead. At 54 Mbps., E-MiLi's throughput is 6.3% lower than the legacy 802.11. Coordination scheme's throughput is slightly higher than E-MiLi (1.5% at 54 Mbps), as it can use a single gap to deliver information (E-MiLi needs at least two sequences of the same length), thus inducing less overhead.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for coordinating communication amongst wireless communication devices in a wireless network, comprising:
   receiving, at a receive device, a data packet via a wireless communication link from a transmit device;
   detecting, by the receive device, a preamble of the data packet, the preamble comprised of a sequence of energy pulses, where energy pulses are separated by a gap and duration of a single the gap in the sequence of pulses encodes coordination data for the receive device, each energy pulse in the sequence of pulses has a length and is comprised of a plurality of data samples, where each pulse includes at least D samples and D is a ratio of a clock rate of the transmit device to a clock rate of the receive device;
   extracting, by the receive device, the coordination data from the preamble of the data packet; and
   coordinating, by the receive device, communication between the transmit device and the receive device using the coordination data.

2. The method of claim 1 further comprises constructing the preamble for the data packet such that value of each of the plurality of data samples is the same.

3. The method of claim 2 further comprises constructing the preamble for the data packet such that the gap between energy pulses is a sequence of zeroes having a minimum length that is larger than the ratio.

4. The method of claim 2 further comprises constructing the preamble for the data packet such that the gap between energy pulses has a maximum length that is smaller than a carrier sensing duration of protocols employed in the network.

5. The method of claim 2 wherein detecting a preamble further comprises:
   sampling an incoming data signal to yield a plurality of data samples;
   determining an energy level for a given data sample;
   determining an average energy level for a group of recent data samples using the energy level of the given data sample;
   determining a signal to noise ratio for the given data sample using the average energy level; and
   determining whether the given data sample is part of an energy pulse by comparing the signal to noise ratio for the given data sample to a predefined threshold.

6. The method of claim 5 further comprises detecting a trailing edge for a given energy pulse and computing the gap between two consecutive energy pulses upon detecting the trailing edge of the given energy pulse.

7. The method of claim 1 wherein coordinating communication further comprises restoring, by the receive device, clock rate of a clock in the receive device to a full clock rate when the data packet is intended for the receive device, where the coordination data is indicative of an address for the receive device.

8. A method for coordinating communication amongst wireless communication devices in a wireless network, comprising:
   receiving, at a receive device, an incoming data signal via a wireless communication link from a transmit device, where the incoming data signal includes a preamble comprised of a sequence of energy pulses and consecutive energy pulses are separated by a gap such that the gap between energy pulses is a sequence of zeroes having a minimum length that is larger than D samples, where D is a ratio of a clock rate of the transmit device to a clock rate of the receive device;

sampling, by the receive device, the incoming data signal to yield a plurality of data samples; detecting, by the receive device, edges of the energy pulses embodied in the incoming data signal;

determining, by the receive device, duration of the gap between energy pulses using the detected edges of the energy pulses, where the duration of a single the gap encodes coordination data for the receive device; and coordinating, by the receive device, communication between the receive device and the transmit device based on the coordination data.

9. The method of claim 8 further comprises constructing, by the transmit device, the preamble for the data packet and transmitting the data packet across the wireless network, such that each energy pulse in the sequence of energy pulses has a length and is comprised of a plurality of data samples, where the length is larger than a ratio of clock rate of the transmit device to clock rate of the receive device.

10. The method of claim 9 further comprises constructing the preamble for the data packet such that value of each of the plurality of data samples is the same.

11. The method of claim 10 further comprise constructing the preamble for the data packet such that the gap between energy pulses is a sequence of zeroes having a minimum length that is larger than the ratio.

12. The method of claim 10 further comprises constructing the preamble for the data packet such that the gap between energy pulses has a maximum length that is smaller than a carrier sensing duration of the protocols employed in the network.

13. The method of claim 8 wherein detecting edges of the energy pulses further comprises determining an energy level for a given data sample from the plurality of data samples;

updating an average energy level for a recent group of data samples using the energy level of the given data sample;

determining a signal to noise ratio for the given data sample based in part on the updated average energy level; and determining whether the given data sample is part of an energy pulse by comparing the signal to noise ratio for the given data sample to a predefined threshold.

14. The method of claim 13 further comprises detecting a trailing edge for a given energy pulse; and computing the gap between two consecutive energy pulses upon detecting the trailing edge of the given energy pulse.

15. The method of claim 8 wherein coordinating communication further comprises restoring, by the receive device, clock rate of a clock in the receive device to a full clock rate when the data packet is intended for the receive device, where the coordination data is indicative of an address for the receive device.

16. A method for reducing power consumption of a wireless communication device, comprising:

reducing, by a receiver in the device, clock rate of a clock during an idle listening period of the device, the reduced clock rate being less than a full clock rate and the clock operating a receiver of the device;

detecting, by the receiver, a preamble of a data packet received by the receiver during the idle listening period, the preamble is comprised of a sequence of energy pulses, where energy pulses are separated by a gap and duration of a single the gap indicates an address of an intended device, each energy pulse in the sequence of pulses has a length and the length of each energy pulse is at least D samples, where D is a ratio of a clock rate of a transmitter to a clock rate of the receiver;

determining, by the receiver, whether the data packet is intended for the device, the determination being based on the duration of the gap;

restoring, by the receiver, clock rate of the clock to the full clock rate when the duration of the gap correlates to the address of the device; and continuing to operate the clock at the reduced clock rate when the duration of the gap does not correlate to the address of the device.

17. The method of claim 16 wherein detecting a preamble further comprises sampling, by the receive device, an incoming data signal to yield a plurality of data samples;

detecting, by the receive device, edges of the energy pulses embodied in the incoming data signal; and determining, by the receive device, duration of the gap between energy pulses using the edges of the energy pulse, where the duration of the gap encodes coordination data for the receive device.

18. The method of claim 17 wherein detecting edges of the energy pulses further comprises determining an energy level for a given data sample from the plurality of data samples;

updating an average energy level for a recent group of data samples using the energy level of the given data sample;

determining a signal to noise ratio for the given data sample based in part on the updated average energy level; and determining whether the given data sample is part of an energy pulse by comparing the signal to noise ratio for the given data sample to a predefined threshold.

19. The method of claim 18 further comprises detecting a trailing edge for a given energy pulse; and computing the gap between two consecutive energy pulses upon detecting the trailing edge of the given energy pulse.

* * * * *